(12) United States Patent
Feigl

(10) Patent No.: US 10,476,047 B2
(45) Date of Patent: Nov. 12, 2019

(54) BATTERY CELL COMPRISING A HOUSING COVERING PLATE HAVING A RAISED CENTRAL REGION

(71) Applicant: Robert Bosch GmbH, Stuttgart (DE)

(72) Inventor: Markus Feigl, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 574 days.

(21) Appl. No.: 14/431,016

(22) PCT Filed: Jul. 30, 2013

(86) PCT No.: PCT/EP2013/065982
§ 371 (c)(1),
(2) Date: Mar. 25, 2015

(87) PCT Pub. No.: WO2014/048613
PCT Pub. Date: Apr. 3, 2014

(65) Prior Publication Data
US 2015/0255762 A1  Sep. 10, 2015

(30) Foreign Application Priority Data

Sep. 26, 2012 (DE) .................. 10 2012 217 454

(51) Int. Cl.
*H01M 2/04* (2006.01)
*H01M 2/06* (2006.01)
*H01M 10/04* (2006.01)

(52) U.S. Cl.
CPC ......... *H01M 2/0456* (2013.01); *H01M 2/043* (2013.01); *H01M 2/0426* (2013.01);
(Continued)

(58) Field of Classification Search
CPC ........... H01M 10/0431; H01M 2/0426; H01M 2/043; H01M 2/0456; H01M 2/0473; H01M 2/06; H01M 2220/20
See application file for complete search history.

(56) References Cited

U.S. PATENT DOCUMENTS

| 4,053,687 A | 10/1977 | Coibion et al. |
| 6,573,000 B1 * | 6/2003 | Miyazaki ............ H01M 2/0439 429/185 |

(Continued)

FOREIGN PATENT DOCUMENTS

| CN | 2351837 Y | 12/1999 |
| CN | 201936961 U | 8/2011 |

(Continued)

OTHER PUBLICATIONS

Machine Traslation of JPH10261400 A, Kobayashi et al., extracted on Mar. 24, 2017.*

(Continued)

*Primary Examiner* — Stephen J Yanchuk
(74) *Attorney, Agent, or Firm* — Michael Best & Friedrich LLP

(57) ABSTRACT

The invention relates to a battery cell, in particular a lithium-ion battery cell, wherein a cover plate (23) forming a part of a battery cell housing, which is designed as a plane sheet in a conventional manner, is modified to avoid short circuits between the poles of the battery cell due to moisture, for example. To this end, the cover plate (23) is provided with a central area (33) and an edge area (35) surrounding said central area (33). The central area (33) is located above an opening (14) to be closed off by the cover plate (23) of a container (13) forming a part of the battery cell housing, whereas the edge area (35) extends inside said opening (14). Thus, occurring moisture can drain off the platform-like raised central area (33) sideways toward a channel (37) in the edge area (35), and evaporate from there.

20 Claims, 4 Drawing Sheets

(52) U.S. Cl.
CPC ......... *H01M 2/06* (2013.01); *H01M 10/0431* (2013.01); *H01M 2/0473* (2013.01); *H01M 2220/20* (2013.01)

(56) References Cited

U.S. PATENT DOCUMENTS

| | | | |
|---|---|---|---|
| 2006/0099494 A1* | 5/2006 | Jung | H01M 2/0426 429/72 |
| 2008/0193833 A1* | 8/2008 | Ohashi | B32B 27/32 429/129 |
| 2012/0040214 A1* | 2/2012 | Kim | H01M 2/1241 429/56 |

FOREIGN PATENT DOCUMENTS

| | | |
|---|---|---|
| JP | H09161493 A | 6/1997 |
| JP | 10261400 | 9/1998 |
| JP | 2010097770 | 4/2010 |

OTHER PUBLICATIONS

Machine translation of JPH 10261400, Kobayashi Morio, "Nonaqueous Electrolyte Secondary Battery" extracted Aug. 25, 2017.*
International Search Report for Application No. PCT/EP2013/065982 dated Nov. 13, 2013 (English Translation, 2 pages).

* cited by examiner

BATTERY CELL COMPRISING A HOUSING COVERING PLATE HAVING A RAISED CENTRAL REGION

BACKGROUND OF THE INVENTION

The present invention relates to a battery cell, in particular a lithium-ion battery cell. In addition, the invention relates to a motor vehicle comprising such a battery cell.

Battery cells, sometimes also referred to as rechargeable battery cells, are used for the chemical storage of energy provided electrically. Already today battery cells are used for supplying energy to a large number of mobile devices. In the future, battery cells are intended to be used, inter alia, for supplying energy to mobile electric vehicles or hybrid vehicles, on land and in water, and for the stationary buffer-storage of electrical energy originating from alternative energy sources.

For this purpose, usually a large number of battery cells are assembled to form battery packs. In order to use a pack volume available in this case in a manner which is as efficient as possible, primarily battery cells having a prismatic, for example a right-parallelepipedal form are used for such purposes.

Owing to its possible high energy density, thermal stability and lack of memory effect, a lithium-ion rechargeable battery technology, which is being developed intensively at present owing to the high economic significance of future electromobility, is usually used for demanding applications such as storage solutions for motor vehicles, for example.

There are already many different types of battery cells, in particular lithium-ion battery cells, and in addition in particular battery cells having a prismatic form. In this case, components of the battery cell are usually accommodated in hermetically sealed tight fashion in the interior of a housing. The housing generally comprises a container which is open at the top and a cover arrangement, which closes off this container in sealed tight fashion at the top. Part of the cover arrangement is usually a covering plate, which is connected to the container at its rims in sealed tight fashion, for example by virtue of the covering plate being welded to a container rim. Openings are provided in the covering plate, and contact arrangements which are accessible from the outside and are electrically connected to the internal components, for example, reach through said openings.

It has been observed that unexpected short circuits can arise in the case of battery cells, in particular in moist operating conditions.

SUMMARY OF THE INVENTION

With the aid of embodiments of the present invention, it is possible to reduce, inter alia, the risk of short circuits in battery cells.

The invention proposes a battery cell, in particular a lithium-ion battery cell, which has a coil element, an electrolyte, two current collectors and a housing. The coil element comprises a wound stack of a first film, coated with anode material, for example comprising copper, a second film, coated with cathode material, for example comprising aluminum, and two plastic films acting as diaphragms. One of the current collectors is electrically conductively connected, for example welded, to the first film of the coil element. The second current collector is electrically conductively connected to the second film of the coil element. The housing has a metallic container and a metallic cover arrangement. The container has an opening, through which the coil element and the two current collectors can be introduced into the housing during manufacture of the battery cell. The cover arrangement is designed to close off the opening of the container in a gas-tight and pressure-tight manner. For this purpose, the cover arrangement has, inter alia, a covering plate, which can largely close the opening in the container and which can be connected to the container, for example by means of a weld seam, for hermetically sealing the housing. A leadthrough arrangement is formed on the cover arrangement in order to pass electrically conductive contact arrangements, which are each in contact with one of the current collectors in the interior of the housing, out of the housing through the cover arrangement. The proposed battery cell is in this case characterized by the fact that the covering plate has a central region and a peripheral region surrounding the central region, wherein the central region extends above the opening of the container, whereas the peripheral region extends within the opening of the container.

Embodiments of the battery cell according to the invention are based, inter alia, on the following concepts and findings:

In the case of housings for conventional battery cells, a covering plate closing off the opening of the container is generally flat. The covering plate can be stamped out of a metal sheet for this purpose in such a way that an outer contour of the stamped-out covering plate substantially corresponds to the inner cross section of the container in the region of the opening. Thus, the outer rim of the covering plate can be welded easily and in hermetically seal tight fashion to the inner surface of the wall of the container. In addition, through-holes are stamped out in the covering plate, with the electrically conductive contact arrangements being passed through said through-holes in each case from the interior of the housing where they are electrically connected to one of the current collectors outwards out of the housing, where they can form one of the terminal contacts of the battery cell.

It has now been observed that, in particular in the case of battery cells which are used in a moist environment, for example in the case of applications in ships or in a moist climate, short circuits can occur between the terminals of the battery cell. More involved investigations have shown that these short circuits could be attributed to a thin film of water which can form, for example, as a result of condensing water vapor or spray water. In this case, water can collect on the covering plate of the battery cell housing and, in the worst case scenario, produce an electrical connection between the two contact terminals.

It is therefore proposed that the covering plate is not flat, but is formed with a central region, which extends above the opening of the container, and a peripheral region surrounding this central region, which peripheral region extends within the opening of the container. In other words, the central region can protrude beyond the peripheral region of the covering plate in a manner of a platform so that the higher central region extends further removed from the interior of the container than the lower peripheral region. The central region can in this case extend outside a volume surrounded by the container, whereas the peripheral region can extend within such a volume or at the interface thereof.

The central region can extend at least beyond a subregion of the covering plate, wherein this subregion extends from a contact arrangement forming a positive terminal to a contact arrangement forming a negative terminal. In other words, the central region is intended to extend at least in a subregion of the covering plate in which collecting water could otherwise result in a short circuit between the two contact arrangements. Owing to the fact that the central region is raised in comparison with the peripheral region, it is possible to avoid a situation in which water accumulates there. Instead, water can flow away from the central region which is raised in the form of a platform laterally towards the lower peripheral region, where it cannot effect a short circuit.

The covering plate comprising a central region and a peripheral region running on different levels can be produced, for example, by means of embossing of a metal sheet. In this case, the central region itself can be flat and possibly a transition towards the lower peripheral region can be rounded off in order to facilitate the flow of moisture away from the central region towards the peripheral region. Alternatively, the central region can also be outwardly convex, so that a center of the central region protrudes beyond the peripheral region further outwards than a rim of the central region. In this way, water is further assisted in flowing away from the central region towards the peripheral region. In particular, a rounded transition between the central region and the peripheral region can have a supporting effect in respect of this flowing away of water.

The peripheral region can form a channel which reaches inwards into the opening of the container and which can act as a water collection channel. Water flowing away from the central region can therefore flow into the channel and evaporate there over time. This makes it possible to prevent the water from flowing towards adjacent battery cells, for example, and causing damage there or from pouring into a housing surrounding a battery cell, as a result of which corrosion could arise there.

The channel can have a U-shaped cross section. An inner flank of the channel, i.e. a flank of the channel which becomes the inner central region, can in this case be higher than an outer flank. This makes it possible for water which collects in the channel to not be able to arrive at the central region since it can flow away before this via the lower outer flank.

The peripheral region can have a border region which protrudes laterally outwards, adjacent to the channel. With this border region, the covering plate can laterally adjoin the inner surface of the container and be welded thereto there.

The described features of the battery cell and configurations of the components of the battery cell, in particular the covering plate, are particularly suitable for use in battery cells whose housing has a prismatic form.

It will be mentioned that possible features and advantages of a battery cell according to the invention are described herein with reference to various embodiments. A person skilled in the art will understand that the individual features can be combined in a suitable manner with one another or replaced by one another in order to in this way arrive at further embodiments and possible synergy effects.

BRIEF DESCRIPTION OF THE DRAWINGS

Embodiments of the present invention will be described below with reference to the attached drawings, wherein neither the description nor the drawings should be interpreted as restrictive to the invention.

The figures are merely schematic and are not true to scale. Identical reference symbols in the figures denote identical or functionally identical features.

DETAILED DESCRIPTION

Figure 1:
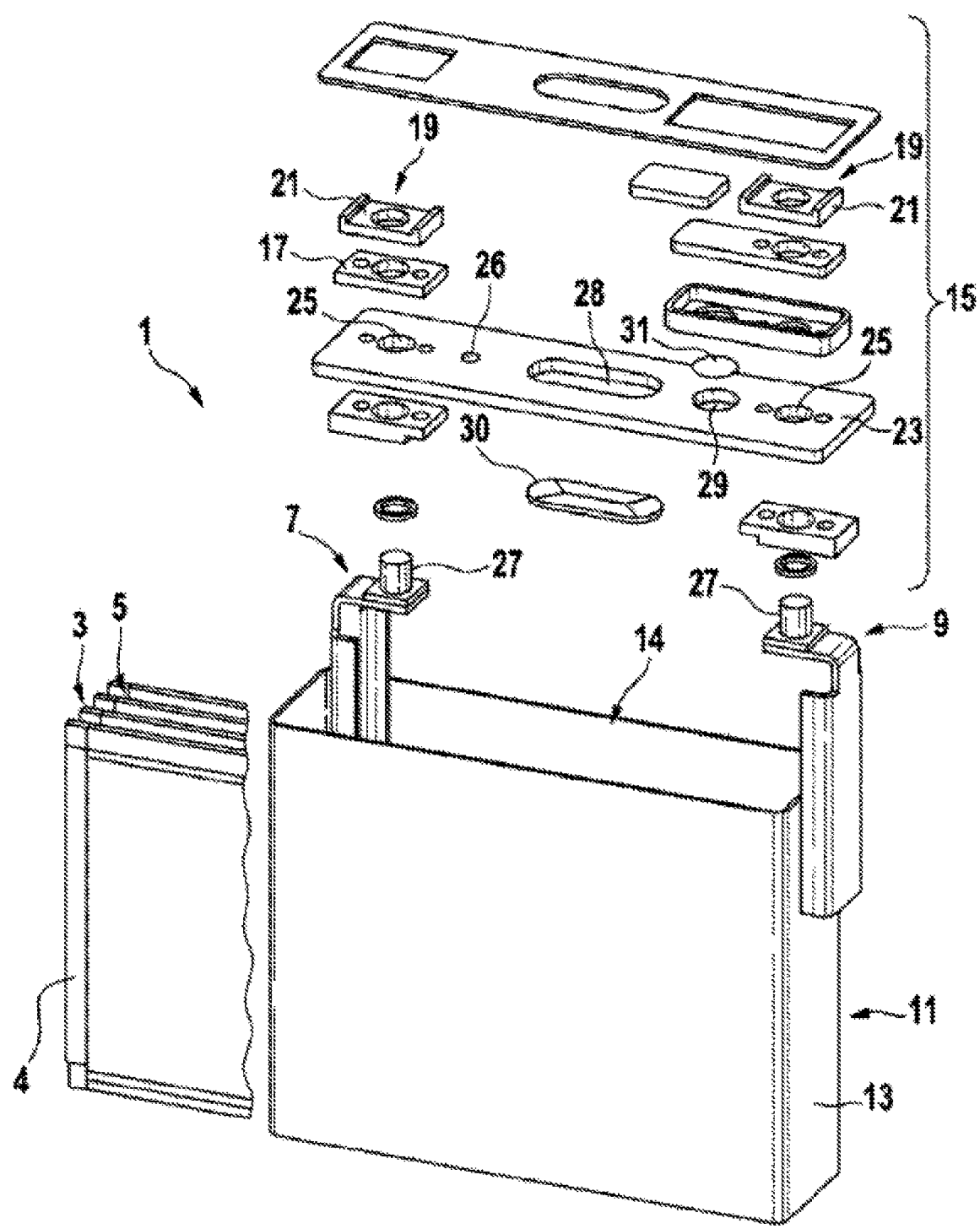
FIG. 1 shows an exploded drawing of a conventional lithium-ion battery cell.

FIG. 1 shows a conventional lithium-ion battery cell in an exploded view. It can be seen that the battery cell comprises a large number of individual components, which are provided separately and need to be assembled in a complex manner during manufacture. Only the component parts which are necessary for the understanding of embodiments of the invention and the features thereof are described herein, and no description is provided of the remaining component parts of the battery cell.

The battery cell 1 has a coil element 3 comprising a wound stack 5 comprising a copper film, which is coated with anode material, and an aluminum film, which is coated with cathode material, and plastic films therebetween, which act as diaphragms.

For electrical contact-making, the copper film and the aluminum film are stacked one on top of the other with a slight offset along the winding axis in the opposite direction so that the copper film on one narrow side and the aluminum film on an opposite narrow side protrude slightly beyond a respective rim of the coil element. A copper current collector 7 is welded to a protruding region 4 of the copper film so that said current collector is electrically connected to the anode of the coil element. An aluminum second current collector 9 is welded to an opposite protruding region of the aluminum film in order to produce an electrical contact to the cathode of the coil element 3.

The coil element 3 provided with the two current collectors 7, 9 is then introduced into a right-parallelepipedal container 13, which is open at the top, through an opening 14. The opening 14 of the container 13 is then closed by a covering plate 23. For this purpose, the covering plate 23 is welded at its rim to an inner surface of the container 13 in the region of the opening 14. Then, a liquid electrolyte is introduced into the container 13 through a small opening 26 in the covering plate 23, said electrolyte therefore coming into contact with the anode and cathode materials provided on the metal films of the coil element so that desired chemical reactions between these materials and the electrolyte and, correspondingly, conversion of chemical energy into electrical energy, and vice versa, can arise at the interfaces. The container 13 is formed from a metal sheet in order to be able to withstand the chemically aggressive electrolyte, inter alia.

The covering plate 23 has some openings, which are provided for different purposes and which are hermetically sealed during assembly of the battery cell 1. For example, two round openings 25 are provided, through which connection bolts 27 provided on the inner current collectors 7, 9 can be passed to the outside out of the housing so that they can form, as part of the contact arrangements 19, an electrical contact to outer connections 21. In addition, an opening 26 is provided, through which electrolyte can be introduced into the interior of the container 13. Two further openings 28, 29 are used for receiving a rupture disk 30 or a so-called OSD membrane 31.

In the conventional battery cell 1 illustrated in FIG. 1, the covering plate 23 is flat. It can be formed by simple stamping processes from a metal sheet.

Owing to this flat configuration and the fact that the covering plate is welded to the inner surface of the container 13 at its rims so that welding beads can protrude beyond the covering plate 23, however, it may arise that a film of liquid accumulates on the covering plate 23, for example as a result of condensing water vapor. Such a film of liquid can, in the worst case scenario, effect an electrical connection between the bolts 27 protruding through the openings 25 and thus between the two terminals of the battery cell 1, as a result of which a short circuit of the battery cell arises.

Figure 2:
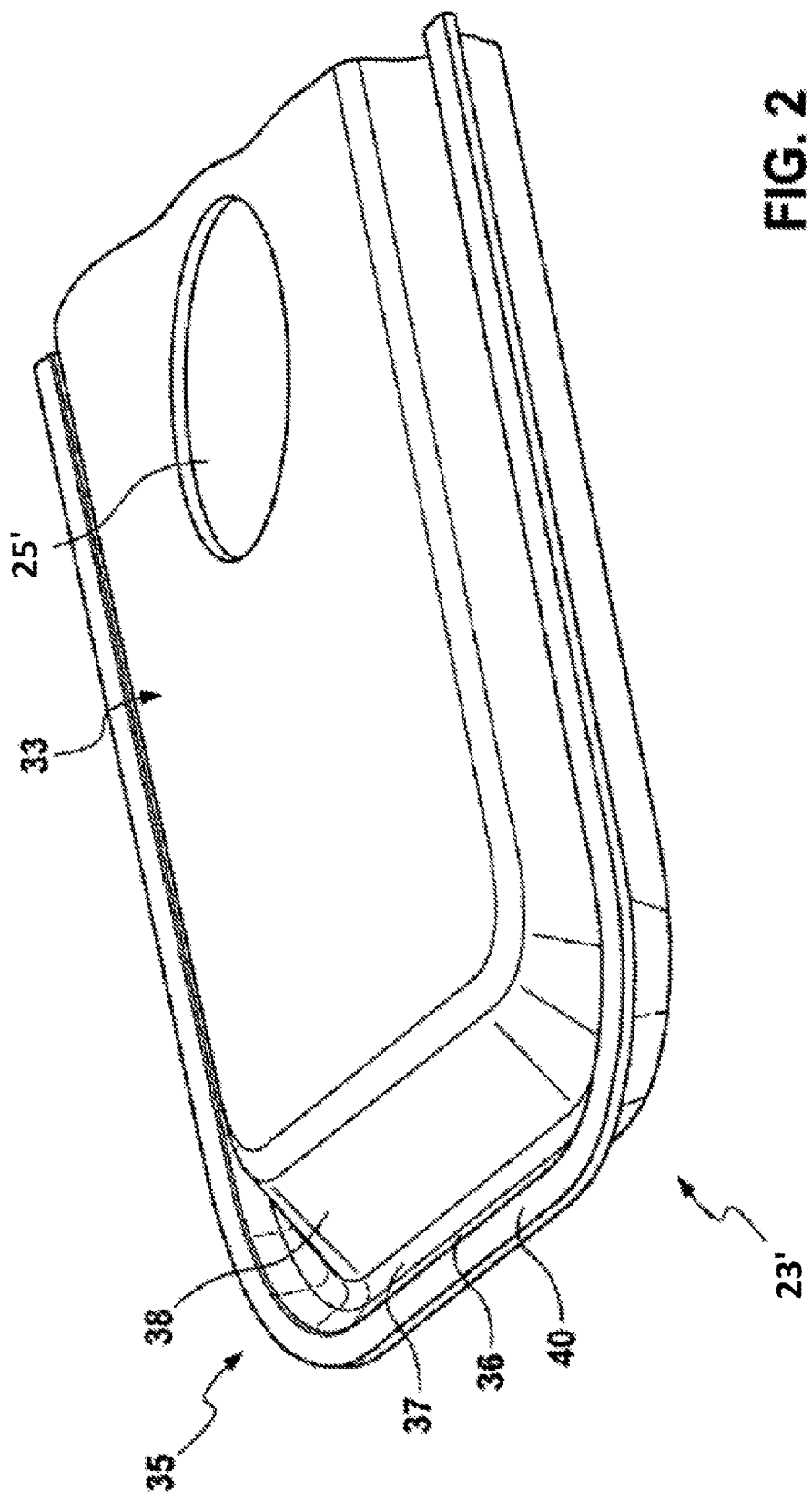
FIG. 2 shows a perspective partial view of a covering plate for a battery cell in accordance with an embodiment of the present invention.
Figure 3:
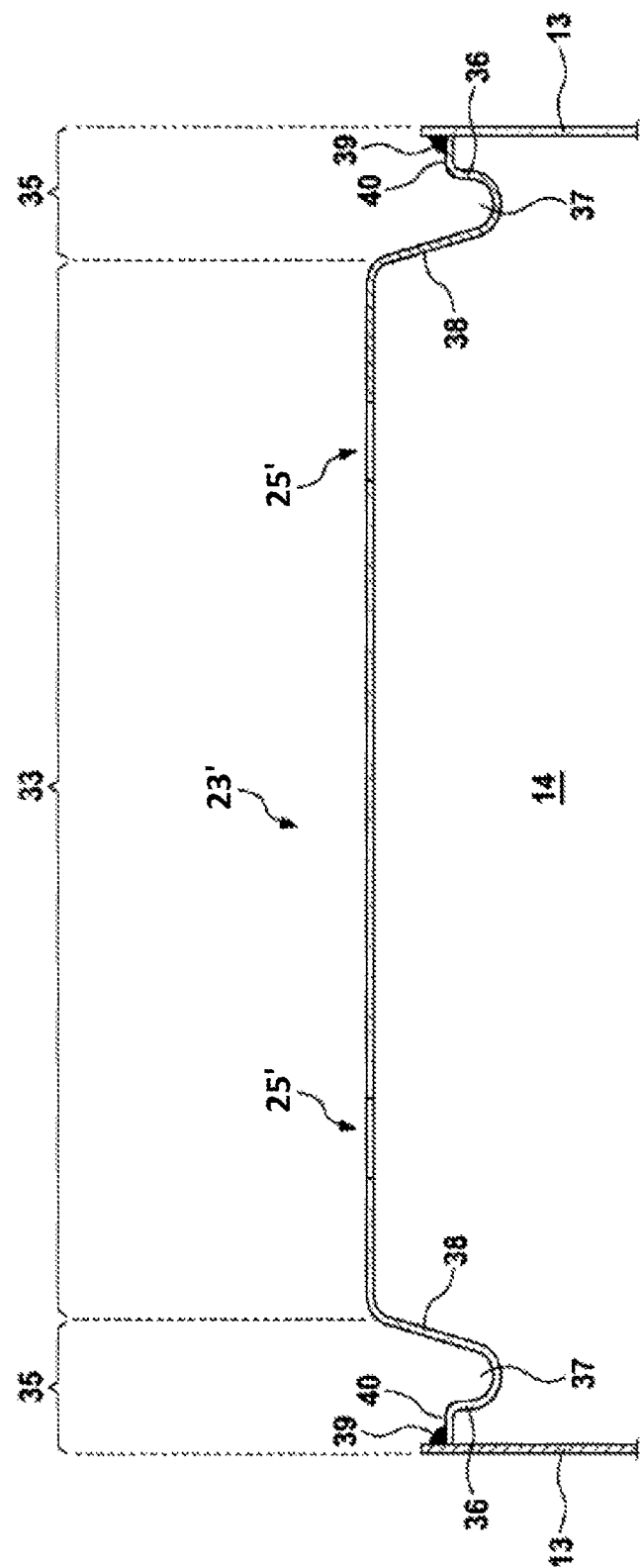
FIG. 3 shows a cross section through a covering plate for a battery cell in accordance with one embodiment of the present invention.
Figure 4:
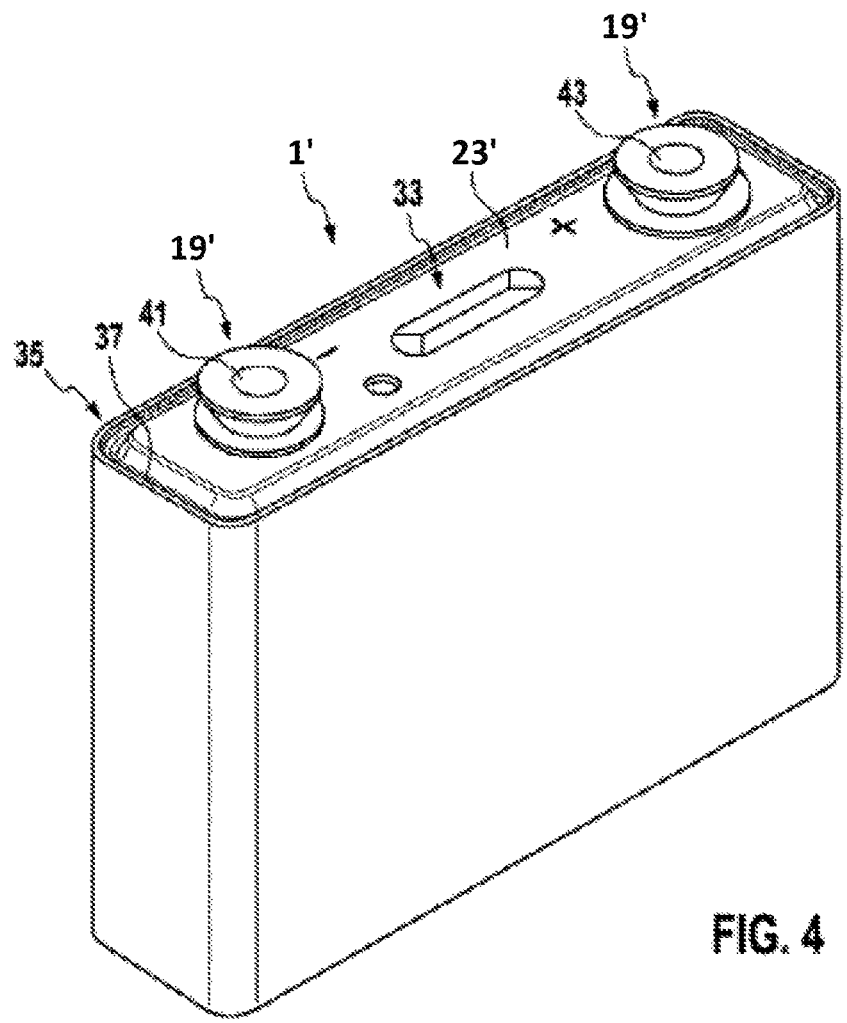
FIG. 4 shows a perspective view of a battery cell comprising a specially formed covering plate in accordance with one embodiment of the present invention.
Figure 5:
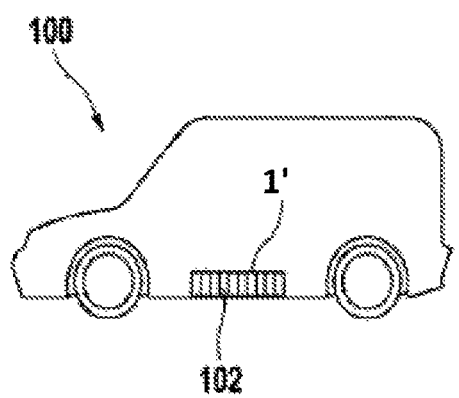
FIG. 5 shows a vehicle comprising a battery in accordance with one embodiment of the present invention.

FIG. 2 shows a perspective partial view of a covering plate 23', as can be used for a battery cell in accordance with an embodiment of the present invention. FIG. 3 shows a cross section through such a coveting plate 23'. FIG. 4 shows a battery cell comprising a covering plate 23' with such a configuration.

As can clearly be seen in particular in FIGS. 2 and 3, the covering plate 23' has a central region 33 and a peripheral region 35, which surrounds said central region 33 in the form of a ring. The central region 33 protrudes beyond the peripheral region 35 in the manner of a platform.

As illustrated in FIG. 3, the covering plate 23' can therefore be arranged in the opening 14 of the container 13 in such a way that the peripheral region 35 is within the opening 14 and the peripheral region 35 can therefore be connected to an inner surface of the container 13 via weld seams 39, but the central region 33 extends above the opening 14 of the container 13.

The central region 33 of the covering plate 23' can be flat, as shown in the figures. However, it is also possible for the central region to be outwardly curved, i.e. convex. A transition between the central region and the adjoining peripheral region should have a rounded configuration.

The peripheral region 35 can form a channel 37, which reaches inwards into the opening 14. This channel 37 can have a U-shaped cross section, wherein an inner flank 38, i.e. a flank of the U-shaped channel which adjoins the inner central region 33, can be higher than an outer flank 36. A laterally protruding border region 40 is provided outwardly adjoining the channel 37, said border region extending substantially horizontal, i.e. parallel to a plane delimiting the opening 14 of the container 13, similarly to the central region 33. The covering plate 23' can be welded to the container 13 in this border region 40.

The central region 33 of the covering plate 23' also contains, inter alia, the openings 25', through which the contact arrangements 19' (not shown in FIGS. 2 and 3) extend. As illustrated in FIG. 4, therefore, the entire region between a contact arrangement 19' forming a positive terminal 43 and a contact arrangement 19' forming a negative terminal 41 is located within the central region 33 of the covering plate 23'

Since this central region 33 is in the form of a platform higher than the surrounding peripheral region 35, moisture occurring can flow away from the central region 33, via the rounded transition thereof towards the channel 37 formed in the peripheral region 35. The moisture can collect there and evaporate over time. The risk of a short circuit between the positive terminal 43 and the negative terminal 41 can therefore be considerably reduced.

FIG. 4 shows a motor vehicle 100 comprising a battery 102, which is assembled from a plurality of the above-described battery cells 1'.

What is claimed is:

1. A battery cell (1'), comprising:
   a coil element (3) comprising a coiled stack (5) comprising a first film, coated with anode material, a second film, coated with cathode material, and two plastic films acting as diaphragms,
   an electrolyte,
   two current collectors (7, 9), of which one is electrically conductively connected to the first film and one is electrically conductively connected to the second film,
   a housing (11) having a metallic container (13) and a metallic cover arrangement (15),
   wherein the container (13) has an opening (14), through which the coil element (3) and the two current collectors (7, 9) are configured to be introduced into the housing (11) during manufacture of the battery cell (1'),
   wherein the cover arrangement (15) has a one-piece covering plate (23') and closes off the opening (14) of the container (13) in a gas-tight and pressure-tight manner,
   wherein a leadthrough arrangement (25') is formed on the cover arrangement (15) for passing through, in a gas-tight manner, electrically conductive contact arrangements (19'), which are each in contact with one of the current collectors (7, 9) in the interior of the housing (11), through the covering plate (23') out of the housing (11),
   wherein the covering plate (23') has a central region (33) and a peripheral region (35) surrounding the central region (33), wherein the central region (33) extends above the opening (14) of the container (13), whereas the peripheral region (35) extends within the opening (14) of the container (13), and
   wherein the peripheral region (35) forms a channel (37) that is a recess in the covering plate, such that when the covering plate is horizontal, the channel collects water flowing away from the central region so that the water can evaporate from the channel.

2. The battery cell as claimed in claim 1, wherein the central region (33) extends at least over a subregion of the covering plate (23'), which subregion extends from a contact arrangement (19') forming a positive terminal (43) up to a contact arrangement (19') forming a negative terminal (41).

3. The battery cell as claimed in claim 1, wherein the central region (33) is flat.

4. The battery cell as claimed in claim 1, wherein the central region (33) is outwardly convex.

5. The battery cell as claimed in claim 1, wherein the central region (33) merges, with a rounded portion, with the peripheral region (35).

6. The battery cell as claimed in claim 1, wherein the channel (37) has a U-shaped cross section.

7. The battery cell as claimed in claim 6, wherein an inner flank (38) of the channel (37) is higher than an outer flank (36).

8. The battery cell as claimed in claim 1, wherein the peripheral region (35) has, adjoining the channel (37) on an outside, a laterally protruding boundary region (40).

9. A motor vehicle (100) having a battery cell 1') as claimed in claim 1.

10. The motor vehicle as claimed in claim 9, wherein the central region (33) extends at least over a subregion of the covering plate (23'), which subregion extends from a contact arrangement (19') forming a positive terminal (43) up to a contact arrangement (19') forming a negative terminal (41).

11. The motor vehicle as claimed in claim 9, wherein the central region (33) is flat.

12. The motor vehicle as claimed in claim 9, wherein the central region (33) is outwardly convex.

13. The motor vehicle as claimed in claim 9, wherein the central region (33) merges, with a rounded portion, with the peripheral region (35).

14. The motor vehicle as claimed in claim 9, wherein the channel (37) has a U-shaped cross section.

15. The motor vehicle as claimed in claim 14, wherein an inner flank (38) of the channel (37) is higher than an outer flank (36).

16. The motor vehicle as claimed in claim 9, wherein the peripheral region (35) has, adjoining the channel (37) on an outside, a laterally protruding boundary region (40).

17. The battery cell as claimed in claim 1, wherein the channel (37) acts as a water collection channel such that the channel (37) does not include any openings.

18. The battery cell as claimed in claim 1, wherein the covering plate (23') is formed by stamping a metal sheet.

19. The battery cell as claimed in claim 1, wherein the cover arrangement (15) closes off the opening (14) of the container (13) in a gas-tight and pressure-tight manner via a weld seam between the covering plate (23') and the container (14).

20. A battery cell (1'), comprising:
- a coil element (3) comprising a coiled stack (5) comprising a first film, coated with anode material, a second film, coated with cathode material, and two plastic films acting as diaphragms,
- an electrolyte,
- two current collectors (7, 9), of which one is electrically conductively connected to the first film and one is electrically conductively connected to the second film,
- a housing (11) having a metallic container (13) and a metallic cover arrangement (15),
- wherein the container (13) has an opening (14), through which the coil element (3) and the two current collectors (7, 9) are configured to be introduced into the housing (11) during manufacture of the battery cell (1'),
- wherein the cover arrangement (15) has a one-piece covering plate (23') and closes off the opening (14) of the container (13) in a gas-tight and pressure-tight manner,
- wherein a leadthrough arrangement (25') is formed on the cover arrangement (15) for passing through, in a gas-tight manner, electrically conductive contact arrangements (19'), which are each in contact with one of the current collectors (7, 9) in the interior of the housing (11), through the covering plate (23') out of the housing (11),
- wherein the covering plate (23') has a central region (33) and a peripheral region (35) surrounding the central region (33), wherein the central region (33) extends above the opening (14) of the container (13) a first distance from the coil element, whereas the peripheral region (35) extends within the opening (14) of the container (13), and
- wherein the peripheral region (35) forms a channel (37) which reaches inwards into the opening (14) at a second distance from the coil element, and a border region a third distance from the coil element, the second distance shorter than the first and third distances, wherein the channel has a u-shaped cross-section.

* * * * *